(12) United States Patent
Tanada (10) Patent No.: US 7,730,716 B2
(45) Date of Patent: Jun. 8, 2010

(54) HC ADSORBING MATERIAL AND DEVICE FOR JUDGING DETERIORATION OF THE HC ADSORBING MATERIAL

(75) Inventor: Hiroshi Tanada, Nagoya (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 805 days.

(21) Appl. No.: 11/505,480

(22) Filed: Aug. 17, 2006

(65) Prior Publication Data

US 2007/0051094 A1    Mar. 8, 2007

(30) Foreign Application Priority Data

Sep. 8, 2005    (JP)   ............... 2005-260794

(51) Int. Cl.
*F01N 3/00* (2006.01)
(52) U.S. Cl. ............... 60/277; 60/276; 60/285; 60/297
(58) Field of Classification Search ............. 60/276, 60/277, 284, 285, 286, 297, 299
See application file for complete search history.

(56) References Cited

U.S. PATENT DOCUMENTS

| | | | |
|---|---|---|---|
| 5,116,586 A | 5/1992 | Baacke et al. | |
| 5,381,657 A | 1/1995 | Takizawa et al. | |
| 5,857,163 A | 1/1999 | Trombley et al. | |
| 5,979,157 A * | 11/1999 | Kinugasa et al. | 60/274 |
| 6,047,544 A | 4/2000 | Yamamoto et al. | |
| 6,145,304 A * | 11/2000 | Takahashi et al. | 60/277 |
| 6,334,304 B1 * | 1/2002 | Machida et al. | 60/274 |
| 6,367,245 B1 * | 4/2002 | Yasui et al. | 60/277 |
| 6,601,383 B2 * | 8/2003 | Hasegawa et al. | 60/276 |
| 6,761,875 B2 | 7/2004 | Kuznicki et al. | |
| 6,976,355 B2 * | 12/2005 | Imada et al. | 60/285 |
| 6,978,598 B2 * | 12/2005 | Takakura et al. | 60/277 |

FOREIGN PATENT DOCUMENTS

| | | |
|---|---|---|
| EP | 0 376 025 A1 | 7/1990 |
| JP | 9-79028 A | 3/1997 |
| JP | 2003-260362 A | 9/2003 |

* cited by examiner

*Primary Examiner*—Binh Q. Tran
(74) *Attorney, Agent, or Firm*—Birch, Stewart, Kolasch & Birch, LLP

(57) ABSTRACT

A HC adsorbing material whose deterioration can be judged with high accuracy and reliability. The HC adsorbing material contains a zeolite having cation adsorption sites (Al sites) to which are bonded ions of an element ($Ce^+$) that exhibits oxygen storage capacity (OSC) in a nonionic state (when present as an oxide).

3 Claims, 8 Drawing Sheets

HC ADSORBING MATERIAL AND DEVICE FOR JUDGING DETERIORATION OF THE HC ADSORBING MATERIAL

BACKGROUND OF THE INVENTION

1. Field of the Invention

The present invention relates to HC (hydrocarbon) adsorbing materials and devices for judging deterioration of such materials. More particularly, the present invention relates to techniques for judging deterioration of a HC adsorbing material using a zeolite.

2. Description of the Related Art

An exhaust gas-purifying catalyst arranged in the exhaust passage of an internal combustion engine, such as a three-way catalyst, is constantly exposed to high-temperature exhaust gas and thus is liable to deteriorate with age under the influence of the exhaust heat. It is therefore important to keep track of deterioration of the exhaust gas-purifying catalyst.

Generally, deterioration of the exhaust gas-purifying catalyst is judged on the basis of a correlation between oxygen storage capacity of an oxygen storage material (OSC material) contained in the exhaust gas-purifying catalyst and deterioration of the catalyst. Specifically, an oxygen sensor is arranged downstream of the exhaust gas-purifying catalyst, for example, and if the oxygen concentration on the downstream side of the exhaust gas-purifying catalyst, detected by the oxygen sensor, approaches the oxygen concentration on the upstream side of the exhaust gas-purifying catalyst, it is judged that the oxygen storage capacity of the oxygen storage material has lowered, that is, the exhaust gas-purifying catalyst has deteriorated.

Meanwhile, HC adsorbing materials capable of adsorbing HC in exhaust gas have recently been developed, and zeolites are commonly known as such HC adsorbing materials. However, the HC adsorbing materials also are liable to deteriorate with age under the influence of exhaust heat, and therefore, it is still important to keep track of deterioration of the exhaust gas-purifying catalyst.

An exhaust gas-purifying catalytic converter has also been developed in which a three-way catalyst and a HC adsorbing material are formed in layers, for example. In such a catalytic converter, there is a correlation between deterioration of the HC adsorbing material and that of the three-way catalyst, and the correlation is utilized to estimate deterioration of the HC adsorbing material through the detection of deterioration of the three-way catalyst.

The HC adsorbing material has the property of adsorbing HC at low temperatures, as in a cold state of an internal combustion engine, and desorbing the adsorbed HC at high temperatures, as in a warm state of the engine. A deterioration diagnosis technique utilizing this property of the HC adsorbing material has also been developed in which $O_2$ sensors are arranged upstream and downstream of the HC adsorbing material, respectively, and deterioration of the HC adsorbing material is judged from the output characteristic of the downstream $O_2$ sensor observed during the warm-up of the engine (cf. Unexamined Japanese Patent Publication No. H09-79028).

In the method wherein deterioration of the HC adsorbing material is estimated by judging deterioration of the three-way catalyst, however, the correlation between deterioration of the HC adsorbing material and that of the three-way catalyst needs to be obtained in advance. Further, deterioration of the HC adsorbing material cannot be judged in the case where the HC adsorbing material alone is used, namely, in the absence of the three-way catalyst.

Also, according to the technique disclosed in the aforementioned Japanese patent publication, the output of the downstream $O_2$ sensor is continuously monitored during the warm-up of the engine, to diagnose the HC adsorption/desorption characteristic of the HC adsorbing material. Thus, if, during the warm-up, the engine operating condition fluctuates with respect to a reference operating condition, the accuracy of judgment is likely to lower to an undesirable level. Moreover, the technique is associated with the problem that deterioration of the HC adsorbing material can be judged only at the time of cold start of the engine.

SUMMARY OF THE INVENTION

The present invention was made to solve the above problems, and an object thereof is to provide a HC adsorbing material whose deterioration can be judged with high accuracy and reliability and a device for judging deterioration of the HC adsorbing material.

To achieve the object, the present invention provides a HC adsorbing material comprising a zeolite, the zeolite having cation adsorption sites to which are bonded ions of an element that exhibits oxygen storage capacity in a nonionic state.

The present invention also provides a device for judging deterioration of a HC adsorbing material arranged in an exhaust passage of an internal combustion engine, wherein the HC adsorbing material comprises a zeolite having cation adsorption sites to which are bonded ions of an element that exhibits oxygen storage capacity in a nonionic state. The deterioration judging device comprises: downstream oxygen concentration detecting means arranged downstream of the HC adsorbing material with respect to a flow of exhaust gas, for detecting concentration of oxygen in the exhaust gas; and deterioration judging means for detecting manifestation of the oxygen storage capacity of the element, based on the detection output of the downstream oxygen concentration detecting means, to judge deterioration of the HC adsorbing material.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of the present invention will be hereinafter described with reference to the accompanying drawings.

Figure 1:
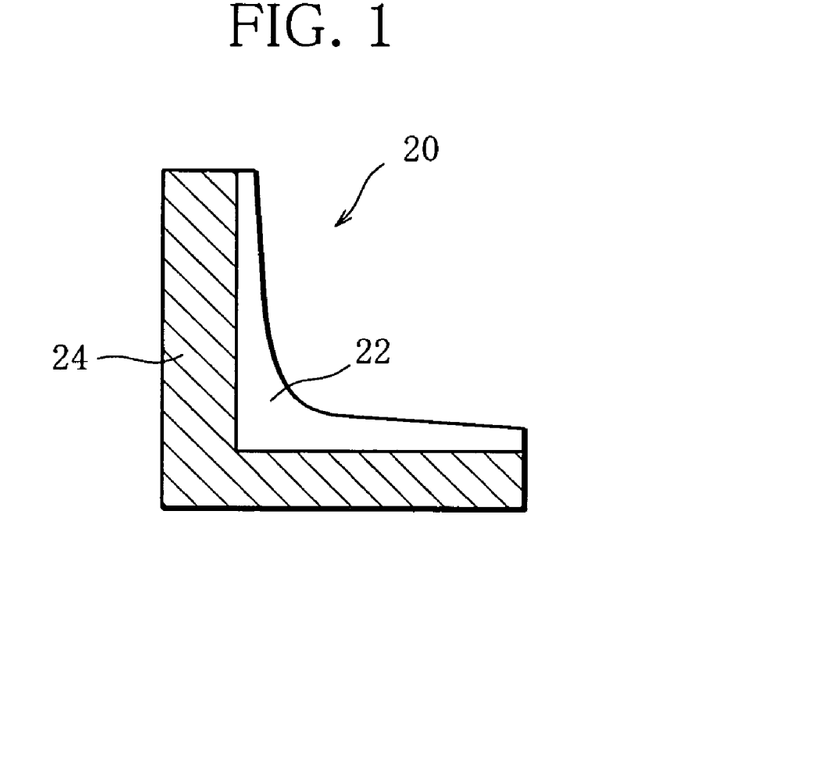
FIG. 1 shows, in enlargement, a quarter part of a cell of a HC trap provided with a HC adsorbing material of the present invention.

FIG. 1 shows, in enlargement, a quarter part of a cell of a HC trap 20. As illustrated, a HC adsorbing material 22 of the present invention is coated on the surface of, for example, a honeycombed (monolithic) support 24 (of, e.g., cordierite, SiC, or metal).

The HC adsorbing material 22 contains, as its principal component, a zeolite including silicon atoms (Si) and aluminum atoms (Al). For the zeolite, β zeolite is used, for example.

Figure 2:
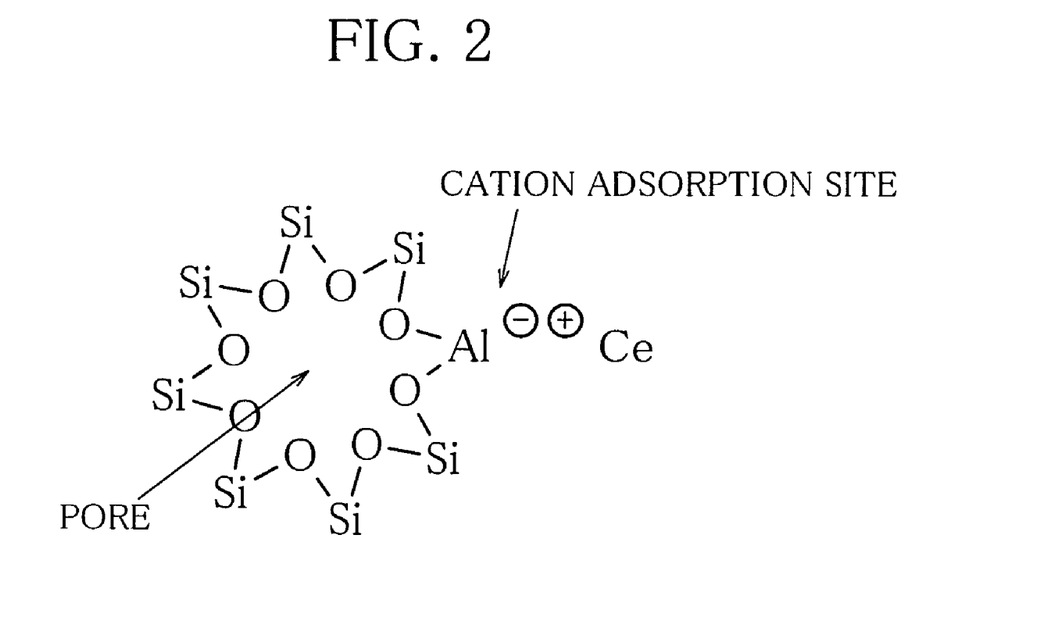
FIG. 2 schematically shows the structure of the HC adsorbing material of the present invention.

Specifically, the HC adsorbing material 22 of the present invention has a general structure shown in FIG. 2. The zeolite has a cation adsorption site on Al which has a negative charge because of the difference in valence between silicon and aluminum. To the cation adsorption site (Al site) is bonded a positive ion of cerium ($Ce^+$) which, when present as an oxide (in a nonionic state), has oxygen storage capacity (OSC). Namely, the zeolite is exchanged, at the cation adsorption sites, with Ce ions as the oxygen storage material (OSC material).

The HC adsorbing material 22 is obtained by mixing an aqueous solution of cerium (cerium acetate) with a zeolite to prepare a slurry. The support 24 is then immersed in the slurry, dried and baked to obtain the HC trap 20.

In this case, the HC adsorbing material 22 is prepared so that the ratio of the number of moles of Ce to that of Al in the zeolite may be in the range of, for example, 0.8 to 1.2, preferably, the number of moles of Ce may not exceed the number of moles of Al in the zeolite (number of moles of Ce≦number of moles of Al). Still preferably, the HC adsorbing material 22 is prepared so that the number of moles of Ce may be substantially equal to the number of moles of Al in the zeolite (number of moles of Ce=number of moles of Al).

The following describes the action of the HC adsorbing material 22 of the present invention.

The zeolite forming the HC adsorbing material 22 has a HC adsorption capacity such that numerous pores thereof adsorb and retain HC in a predetermined temperature range and release the adsorbed HC at temperatures above the predetermined temperature range. Because of deterioration of the zeolite by heat, however, Al is liable to be dissociated, and if this occurs, the pores of the zeolite collapse, lowering the HC adsorption capacity.

Figure 3:
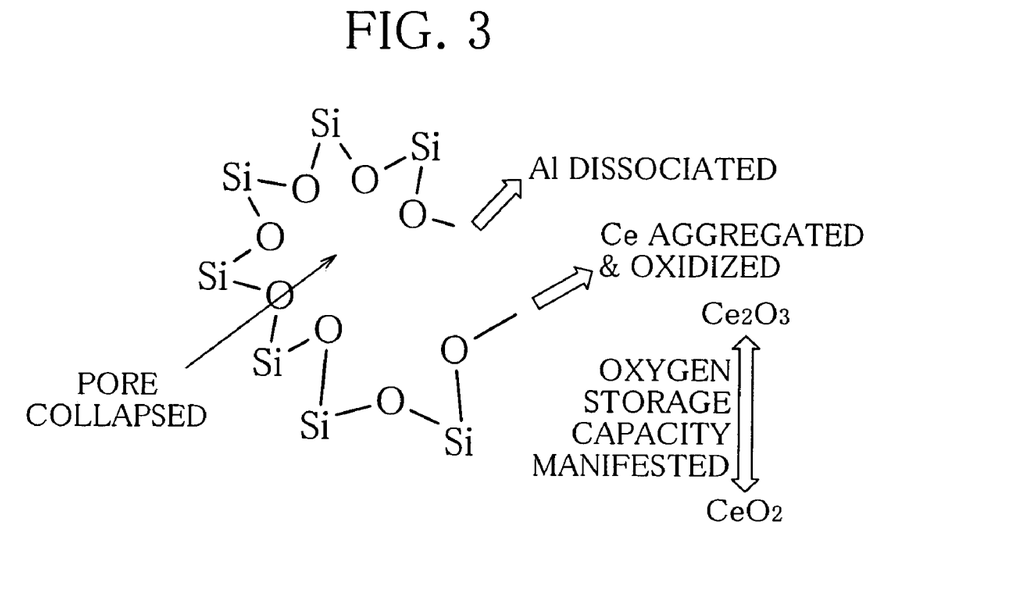
FIG. 3 schematically shows the structure of the HC adsorbing material in a deteriorated state.

If the pores of the zeolite collapse due to the dissociation of Al, as schematically illustrated in FIG. 3, the Ce ions are also dissociated. The thus-dissociated Ce aggregates and oxidizes, forming a cerium oxide which is nonionic matter, that is, ceria ($Ce_2O_3$). Thus, in the HC adsorbing material 22 of the present invention, Ce begins to exhibit oxygen storage capacity as the zeolite is deteriorated by heat. Specifically, ceria ($Ce_2O_3$) is, in oxygen-enriched surroundings, further oxidized to form $CeO_2$, as indicated by the following reaction formula:

$$CeO_2 = Ce_2O_3 + \frac{1}{2} \cdot O_2$$

Figure 4:
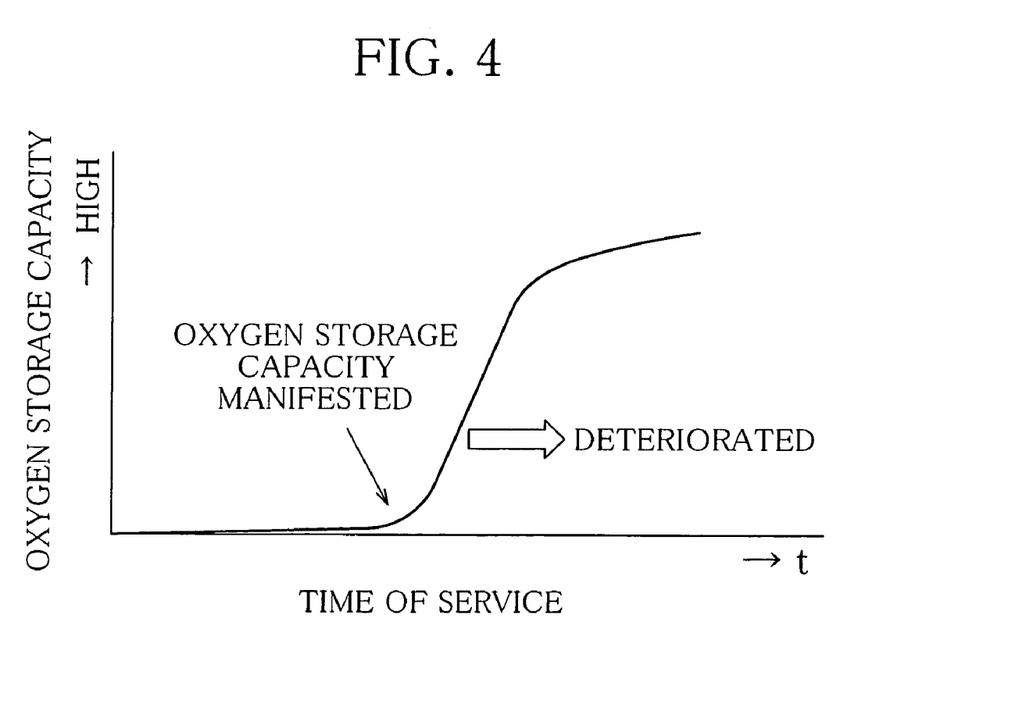
FIG. 4 shows the relationship between the time of service and oxygen storage capacity of the Ce-containing HC adsorbing material of the present invention.

FIG. 4 shows the relationship between the time of service and oxygen storage capacity of the HC adsorbing material 22 containing Ce. As seen from the figure, by detecting manifestation of the oxygen storage capacity of Ce in the HC adsorbing material 22, it is possible to judge with ease deterioration of the zeolite, and thus, of the HC adsorbing material 22.

The HC adsorbing material 22 is prepared so that the number of moles of Ce may not exceed the number of moles of Al in the zeolite, as stated above. In this case, while the zeolite is not yet deteriorated by heat, all of the Ce ions are bonded to the zeolite, so that the oxygen storage capacity does not take effect, and only after Al is dissociated due to heat deterioration of the zeolite, the oxygen storage capacity manifests itself. Deterioration of the HC adsorbing material 22 can therefore be judged with high reliability.

Where the HC adsorbing material 22 is prepared so that the number of moles of Ce may be substantially equal to that of Al in the zeolite, all of the Ce ions are bonded to substantially the same number of Al sites of the zeolite. Moreover, when Al is dissociated due to heat deterioration of the zeolite, Ce is also dissociated without fail, thus exhibiting the oxygen storage capacity. Accordingly, the situation where Ce fails to show the oxygen storage capacity even though Al has begun to be dissociated does not occur, enabling more accurate and reliable judgment as to deterioration of the HC adsorbing material 22.

Devices for judging deterioration of the HC adsorbing material 22 according to the present invention will be now described.

First Embodiment

Figure 5:
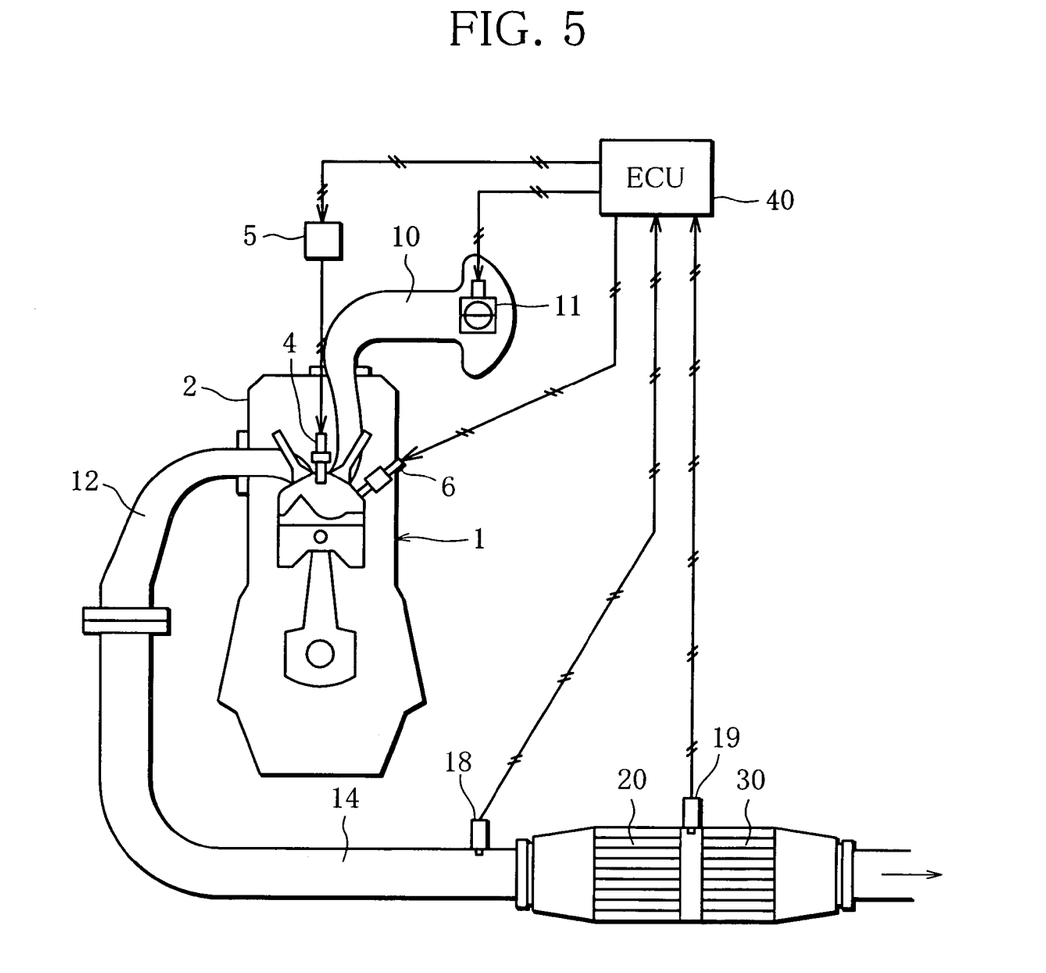
FIG. 5 shows the construction of a deterioration judging device according to a first embodiment of the present invention, which is mounted on a motor vehicle and adapted to judge deterioration of the HC adsorbing material.

FIG. 5 shows the construction of a deterioration judging device according to a first embodiment of the present invention, which is mounted on a motor vehicle and adapted to judge deterioration of the HC adsorbing material.

As shown in FIG. 5, the HC trap 20 containing the aforementioned HC adsorbing material 22 is inserted in the exhaust passage of an internal combustion engine (hereinafter merely referred to as engine) 1.

In this embodiment, a cylinder-injection spark-ignition type gasoline engine is used as the engine 1, by way of example. The engine 1 may, however, be a manifold-injection spark-ignition type gasoline engine or some other engine than the gasoline engine.

As shown in FIG. 5, the engine 1 has a cylinder head 2 to which are mounted a spark plug 4 and a solenoid-operated fuel injection valve 6 with respect to each cylinder, whereby fuel can be injected directly into individual combustion chambers. Specifically, the fuel injection valve 6 is connected via a fuel pipe to a fuel supply device provided with a fuel tank (none of which are shown), and fuel in the fuel tank is supplied under a desired pressure to the fuel injection valve 6 to be injected into the corresponding combustion chamber.

The cylinder head 2 has intake ports associated with each cylinder, and an intake manifold 10 is connected at one end to the intake ports in communication therewith. The intake manifold 10 has the other end provided with an electrically operated throttle valve 11.

Also, the cylinder head 2 has exhaust ports associated with each cylinder, and an exhaust manifold 12 is connected at one end to the exhaust ports in communication therewith.

The exhaust manifold 12 is connected at the other end to an exhaust pipe (exhaust passage) 14, in which is inserted an underfloor catalytic converter (UCC) constituted by the aforementioned HC trap 20 and a three-way catalytic converter 30 arranged downstream of the HC trap 20. The three-way catalytic converter 30 is constructed in the manner known in the art.

An upstream $O_2$ sensor (upstream oxygen concentration detecting means) 18 is arranged upstream of the HC trap 20, for detecting the concentration of oxygen contained in the exhaust gas that is about to flow into the HC trap 20. Also, a downstream $O_2$ sensor (downstream oxygen concentration detecting means) 19 is arranged downstream of the HC trap 20 and upstream of the three-way catalytic converter 30.

An ECU (Electronic Control Unit) 40 includes input/output units, memory devices (ROM, RAM, etc.), a central processing unit (CPU), timer/counters, etc., and performs integrated control on the engine 1 as well as the deterioration judging device of the present invention.

The input side of the ECU 40 is connected with various sensors including the $O_2$ sensors 18 and 19, to be supplied with information detected by the sensors.

The output side of the ECU 40 is connected to the spark plugs 4 through an ignition coil 5, as well as to the fuel injection valves 6 and the throttle valve 11. Optimum values of the fuel injection quantity, fuel injection timing, ignition timing, throttle opening, etc. are calculated based on the information detected by the various sensors, and are output to the ignition coil 5, the fuel injection valves 6, the throttle valve 11, etc. Consequently, a suitable quantity of fuel is injected at suitable timing from each fuel injection valve 6, the fuel is fired at suitable timing by each spark plug 4, and the opening/closing operation of the throttle valve 11 is suitably controlled. Specifically, based on the information from the various sensors, the fuel injection quantity and the throttle opening are set (control means) so that a burn air/fuel ratio (burn A/F) may be controlled to a target burn air/fuel ratio (target A/F, e.g., stoichiometric air/fuel ratio).

More specifically, after the engine 1 is warmed up, an exhaust air/fuel ratio (exhaust A/F) is constantly detected on the basis of the oxygen concentration information from the upstream $O_2$ sensor 18, and in accordance with the exhaust A/F, feedback control (air/fuel ratio feedback control) is performed on the burn A/F. Accordingly, the burn A/F is periodically modulated (air/fuel ratio modulation) between a rich air/fuel ratio (rich A/F) and a lean air/fuel ratio (lean A/F) across the target A/F (e.g., stoichiometric A/F).

The following describes the manner of how deterioration of the HC adsorbing material is judged by the deterioration judging device of the first embodiment configured as described above.

While the HC adsorbing material 22 has adsorbed HC to the full in the predetermined temperature range or the adsorbed HC is completely released at temperatures above the predetermined temperature range, the exhaust gas simply passes by the HC adsorbing material 22 without the composition thereof being changed. Accordingly, the period and amplitude of the exhaust A/F, which vary in accordance with the air/fuel ratio feedback control, are maintained through to the point downstream of the HC trap 20 without phase lag.

Thus, if the HC adsorbing material 22 of the HC trap 20 is not deteriorated yet, then Ce in the HC adsorbing material 22 is yet to exhibit its oxygen storage capacity, and therefore, the outputs of the upstream and downstream $O_2$ sensors 18 and 19 should be almost identical in amplitude, period, phase, etc.

Accordingly, the outputs of the upstream and downstream $O_2$ sensors 18 and 19 are compared with each other, and if the outputs are almost identical in amplitude, period, phase, etc., it can be concluded that the zeolite, and thus the HC adsorbing material 22, is not deteriorated yet.

On the other hand, if the HC adsorbing material 22 of the HC trap 20 is deteriorated, Ce in the HC adsorbing material 22 changes into ceria ($Ce_2O_3$), showing the oxygen storage capacity. In this case, when the exhaust A/F is a lean A/F, ceria adsorbs oxygen in the exhaust gas, and when the exhaust A/F is a rich A/F, the adsorbed oxygen is used to oxidize HC and CO, with the result that the output of the downstream $O_2$ sensor 19 shows a smaller amplitude, a longer period or a phase lag, compared with the output of the upstream $O_2$ sensor 18.

Accordingly, the outputs of the upstream and downstream $O_2$ sensors 18 and 19 are compared with each other, and if the outputs differ in amplitude, period or phase, it can be concluded that Ce in the HC adsorbing material 22 is exhibiting its oxygen storage capacity and that the zeolite, and thus, the HC adsorbing material 22 has deteriorated. It is also possible to determine the degree of deterioration of the HC adsorbing material 22 in accordance with the extent to which the outputs of the upstream and downstream $O_2$ sensors 18 and 19 differ from each other.

In this manner, the HC adsorbing material 22 in which Ce ions are bonded to the zeolite is contained in the HC trap 20, and the outputs of the upstream and downstream $O_2$ sensors 18 and 19 are compared with each other to detect manifestation of the oxygen storage capacity of Ce, whereby deterioration of the HC adsorbing material 22 can be judged in a direct manner with high accuracy and reliability.

In the above embodiment, the outputs of the upstream and downstream $O_2$ sensors 18 and 19 are compared with each other. Where the engine has no upstream $O_2$ sensor and the downstream $O_2$ sensor 19 alone is provided, reference values for the amplitude and period of the exhaust A/F variable in accordance with the air/fuel ratio feedback control may be stored in advance, and change of the output of the downstream $O_2$ sensor 19 relative to the reference values may be monitored to detect manifestation of the oxygen storage capacity of Ce. Also in this case, deterioration of the HC adsorbing material 22 can be judged with high reliability.

Second Embodiment

Figure 6:
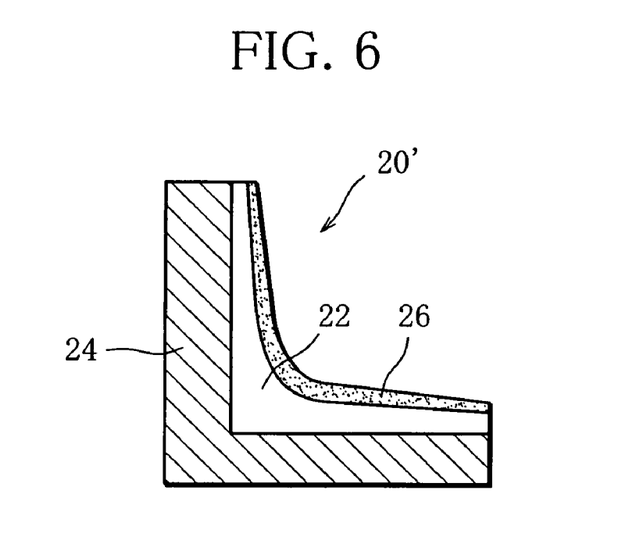
FIG. 6 shows, in enlargement, a quarter part of a cell of a HC trap which is applied to a deterioration judging device according to a second embodiment of the present invention.

A deterioration judging device according to a second embodiment of the present invention has a construction basically identical with that of the deterioration judging device of the first embodiment and differs therefrom only in that a HC trap 20' is used instead of the HC trap 20. In the following, only the differences between the first and second embodiments will be explained.

FIG. 6 shows, in enlargement, a quarter part of a cell of the HC trap 20' used in the deterioration judging device of the second embodiment. As illustrated, the HC trap 20' has a support 24 coated with the HC adsorbing material 22 as an undercoat and also with a three-way catalyst (exhaust gas purifying catalyst) 26 as an overcoat.

The three-way catalyst 26 has capacity to oxidize HC and CO in the exhaust gas, as well as capacity to reduce $NO_x$, and contains a noble metal such as platinum (Pt), rhodium (Rh), palladium (Pd) or the like.

The three-way catalyst 26 additionally contains an oxygen storage material (cerium oxide), besides the noble metal, and thus has oxygen storage capacity as well as catalytic capacity. The oxygen storage capacity of the three-way catalyst 26 may therefore make it virtually impossible to detect manifestation of the oxygen storage capacity of Ce in the HC adsorbing material 22 as a result of deterioration of the HC adsorbing material 22, but this is not the case as explained below.

Figure 7:
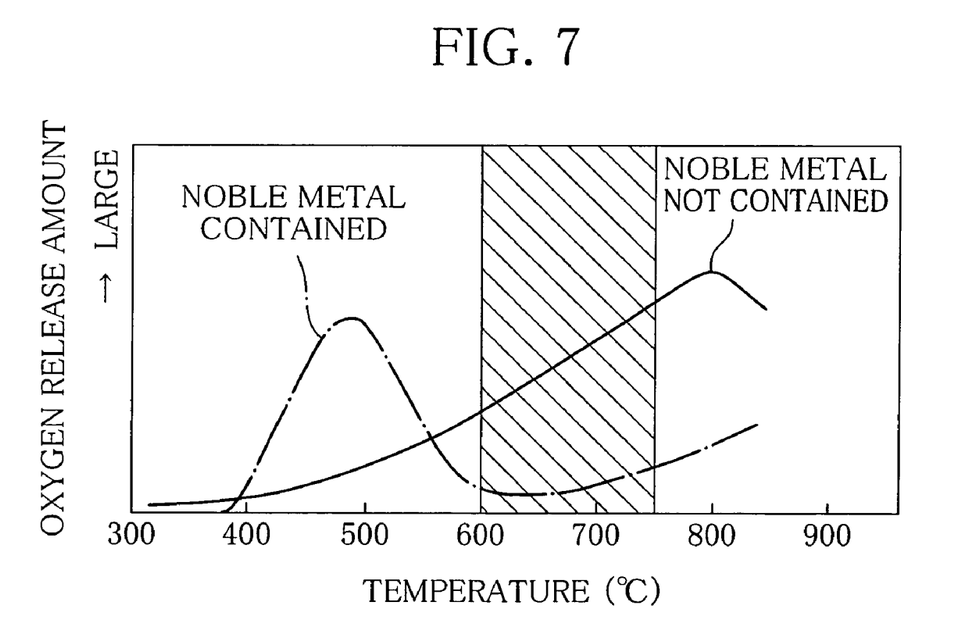
FIG. 7 shows the relationship between temperature and oxygen release amount of cerium oxides with and without a noble metal.

FIG. 7 shows the relationship between temperature and oxygen release amount (equivalent to oxygen storage capacity) of cerium oxide. As seen from the figure, in the case where Ce and the noble metal coexist in their vicinities (as in the three-way catalyst 26), cerium oxide exhibits its oxygen storage capacity in a low, first temperature range (e.g., 400 to 600° C.), as indicated by the dot-dash line. On the other hand, where no noble metal is contained (as in the HC adsorbing material 22), cerium oxide exhibits its oxygen storage capacity in a high temperature range (e.g., in the vicinity of 800° C.) higher than the first temperature range, as indicated by the solid line.

Namely, when the temperature of the HC trap 20' (HC adsorbing material 22+three-way catalyst 26) is within a second temperature range (hatched range of, e.g., 600 to 750° C.) higher than the first temperature range (e.g., 400 to 600° C.), the three-way catalyst 26 does not exhibit its oxygen storage capacity and only ceria ($Ce_2O_3$) of the HC adsorbing material 22 exhibits the oxygen storage capacity. It is therefore possible to judge deterioration of the HC adsorbing material 22 without being influenced by the oxygen storage material of the three-way catalyst 26.

Accordingly, in the case of the HC trap 20' having the three-way catalyst 26 coated on the HC adsorbing material 22, the temperature of the HC trap 20' (HC adsorbing material 22+three-way catalyst 26) is raised to the second temperature range (e.g., 600 to 750° C.), whereby deterioration of the HC adsorbing material 22 can be judged with high reliability, as in the first embodiment, without being influenced by the three-way catalyst 26.

In the aforementioned example, the three-way catalyst 26 is coated over the HC adsorbing material 22. The three-way catalyst may alternatively be coated under the HC adsorbing material 22 or be located immediately upstream or downstream of the HC adsorbing material 22, and also in such cases, the same advantage can be obtained if only Ce is contained in the HC adsorbing material 22.

Third Embodiment

Figure 8:
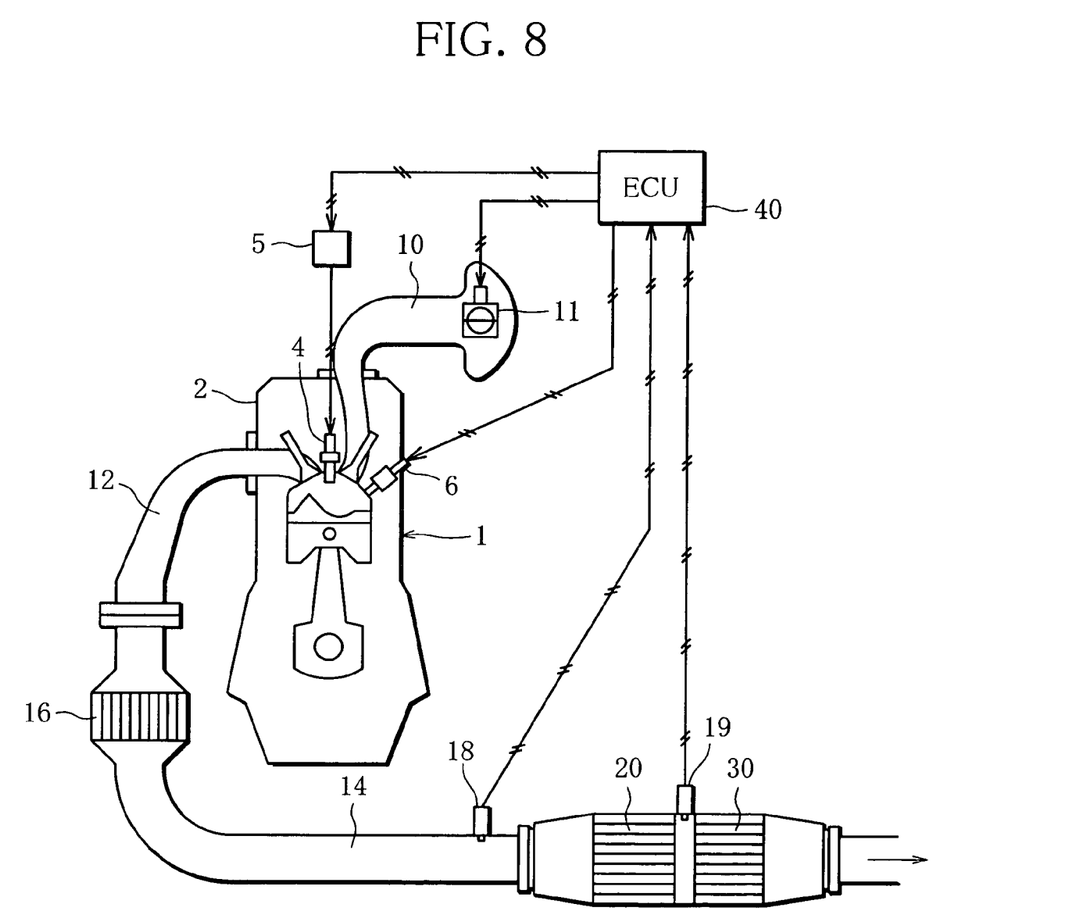
FIG. 8 shows the construction of a deterioration judging device according to a third embodiment of the present invention, which is mounted on a motor vehicle and adapted to judge deterioration of the HC adsorbing material.

FIG. 8 shows the construction of a deterioration judging device according to a third embodiment of the present invention, which is mounted on a motor vehicle and adapted to judge deterioration of the HC adsorbing material.

As seen from FIG. 8, the deterioration judging device of the third embodiment is basically identical in construction with that of the first embodiment and differs therefrom in that a three-way catalytic converter 16 as a front-end catalytic converter (FCC) is inserted in the exhaust pipe 14 and that the engine 1 performs a fuel-cut operation. In the following, only the differences between the first and third embodiments will be explained.

The three-way catalyst of the catalytic converter 16 also contains a noble metal such as platinum (Pt), rhodium (Rh), palladium (Pd) or the like.

Accordingly, as in the second embodiment, the three-way catalyst of the front-end catalytic converter 16 has oxygen storage capacity as well as catalytic capacity. Thus, while the three-way catalytic converter 16 is exhibiting its oxygen storage capacity under the air/fuel ratio feedback control, the HC adsorbing material 22 may fail to be supplied with sufficient oxygen, and this may make it virtually impossible to detect manifestation of the oxygen storage capacity of Ce in the HC adsorbing material 22 as a result of deterioration of the HC adsorbing material 22.

In the third embodiment, moreover, the HC adsorbing material 22 and the three-way catalyst 16 are not located close to each other. It is therefore difficult to simultaneously raise the temperature of both the HC adsorbing material 22 and the three-way catalyst 16 to the second temperature range (e.g., 600 to 750° C.), unlike the second embodiment.

Accordingly, in the third embodiment, deterioration of the HC adsorbing material 22 is judged when fuel-cut is effected, in view of the fact that a large quantity of oxygen is discharged during the fuel-cut operation.

The following describes a procedure for judging deterioration of the HC adsorbing material, executed by the deterioration judging device of the third embodiment.

Figure 9:
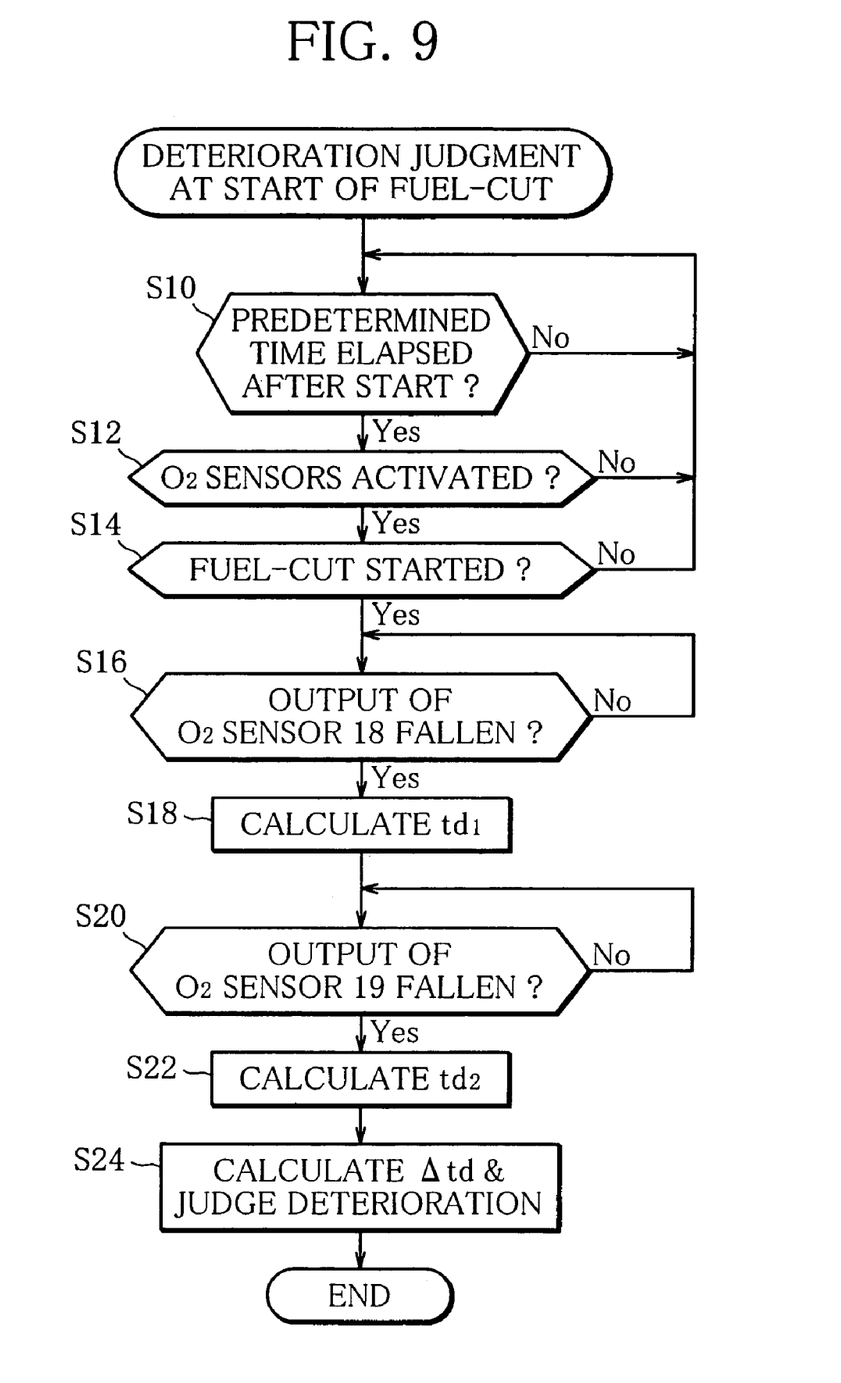
FIG. 9 is a flowchart showing the procedure for judging deterioration at the start of fuel-cut operation, according to the third embodiment of the present invention.
Figure 10:
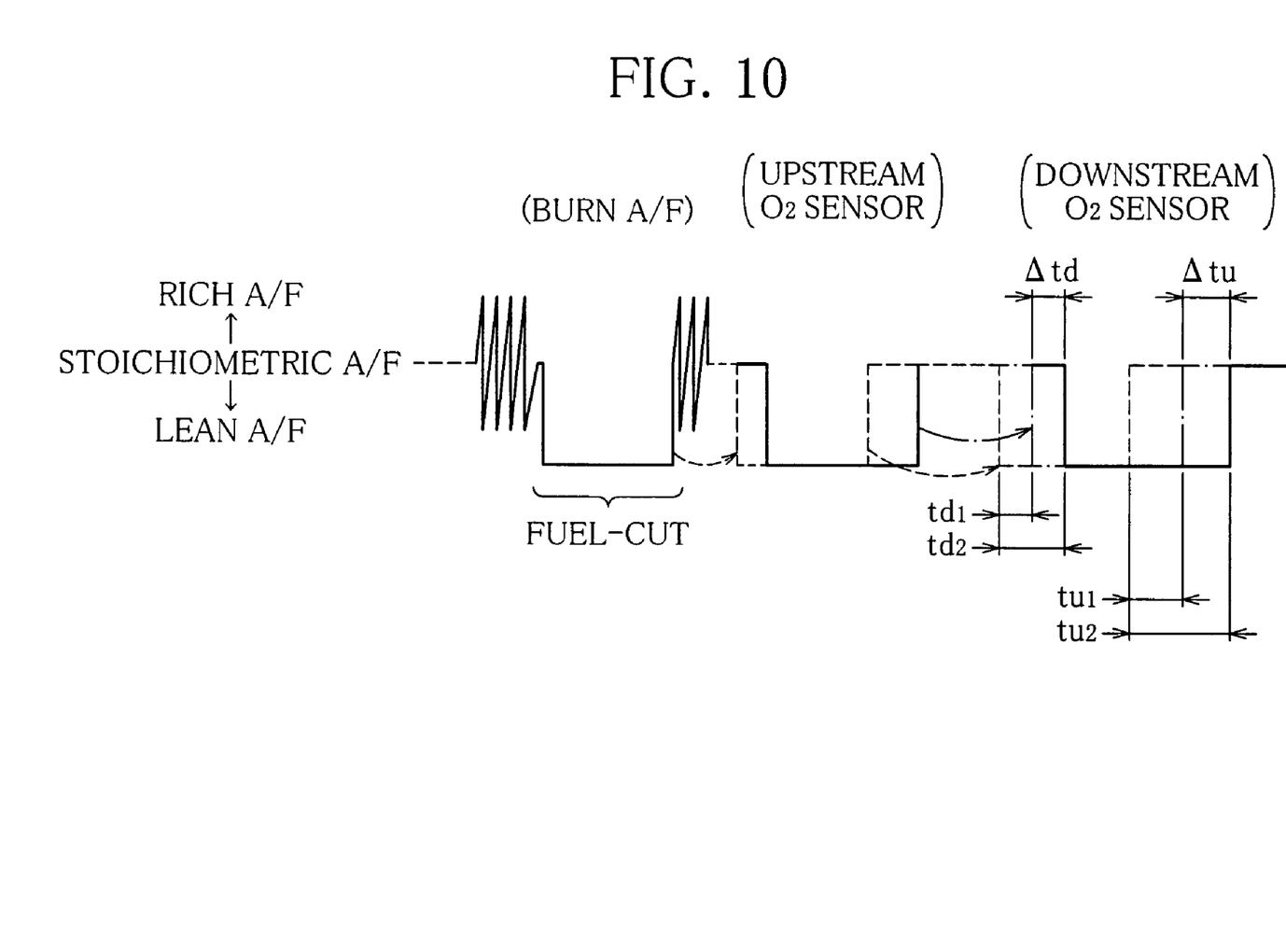
FIG. 10 shows how burn A/F and the detection outputs of upstream and downstream $O_2$ sensors change with the lapse of time when fuel-cut is effected.

FIG. 9 is a flowchart illustrating the procedure for judging deterioration at the start of fuel-cut operation, and FIG. 10 shows how the burn A/F and the detection outputs of the upstream and downstream $O_2$ sensors 18 and 19 change with the lapse of time when fuel-cut is effected. In the following, the flowchart of FIG. 9 will be explained also with reference to FIG. 10.

In Step S10, it is determined whether or not a predetermined time has elapsed after the start of the engine 1. If the result of the decision is negative (No), the routine waits for the lapse of the predetermined time; if the result of the decision is affirmative (Yes), the routine proceeds to Step S12.

In Step S12, it is determined whether or not the upstream and downstream $O_2$ sensors 18 and 19 are both activated. If No in Step S12, the routine waits for the $O_2$ sensors to be activated; if Yes in Step S12, the routine proceeds to Step S14.

In Step S14, it is determined whether or not fuel-cut has been started. Fuel-cut is effected, for example, when the vehicle is decelerating with the accelerator released and at the same time the rotational speed Ne of the engine is higher than a predetermined lower-limit speed. Thus, in this step, it is determined whether these conditions for effecting fuel-cut are fulfilled or not. If No in Step S14, the routine waits for the start of fuel-cut; if Yes in Step S14, the routine proceeds to Step S16.

In Step S16, it is determined based on the detection output of the upstream $O_2$ sensor 18 whether or not the exhaust A/F on the upstream side of the HC trap 20 has greatly changed toward lean A/F side, that is, whether or not the detection output of the upstream $O_2$ sensor 18 has fallen because a quantity of oxygen surpassing the oxygen storage capacity of the three-way catalytic converter 16 is supplied to the HC trap 20. If No in Step S16, the routine waits until a fall of the output of the upstream $O_2$ sensor 18 is detected; if Yes in Step S16, the routine proceeds to Step S18.

In Step S18, a time period td1 from the time the fuel-cut is started to the time the fall of the detection output of the upstream $O_2$ sensor 18 is detected is calculated.

In Step S20 executed after the detection of the fall of the detection output of the upstream $O_2$ sensor 18, it is determined based on the detection output of the downstream $O_2$ sensor 19 whether or not the exhaust A/F on the downstream side of the HC trap 20 has greatly changed toward lean A/F side, that is, whether or not the detection output of the downstream $O_2$ sensor 19 has fallen as a result of the passage of oxygen through the HC trap 20. If No in Step S20, the routine waits until a fall of the detection output of the downstream $O_2$ sensor 19 is detected; if Yes in Step S20, the routine proceeds to Step S22.

In Step S22, a time period td2 from the time the fuel-cut is started to the time the fall of the detection output of the downstream $O_2$ sensor 19 is detected is calculated.

Then, in Step S24, a fall delay time Δtd (follow-up delay) of the downstream $O_2$ sensor 19 is calculated (Δtd=td2−td1)

from the time td1, which represents the time period from the start of the fuel-cut to the detection of the fall of the output of the upstream $O_2$ sensor 18, and the time td2, which represents the time period from the start of the fuel-cut to the detection of the fall of the output of the downstream $O_2$ sensor 19, and deterioration of the HC adsorbing material 22 is judged based on the calculated delay time Δtd.

Specifically, if the HC adsorbing material 22 is not deteriorated, the Ce contained therein does not exhibit its oxygen storage capacity, and therefore, the fall delay time Δtd should be equal to the transport lag of the exhaust gas. Thus, if the delay time Δtd is longer than the transport lag, it can be judged that the Ce is adsorbing oxygen because of its oxygen storage capacity and thus that the HC adsorbing material 22 is deteriorated.

In this manner, the fall delay time Δtd of the downstream $O_2$ sensor 19 is obtained from the time td1, which is the time period from the start of the fuel-cut to the detection of the fall of the output of the upstream $O_2$ sensor 18, and the time td2, which is the time period from the start of the fuel-cut to the detection of the fall of the output of the downstream $O_2$ sensor 19, and by using the delay time Δtd, it is possible to easily detect manifestation of the oxygen storage capacity of Ce contained in the HC adsorbing material. Accordingly, even in the case where the three-way catalytic converter 16 is used as the front-end catalytic converter, deterioration of the HC adsorbing material 22 can be judged with high accuracy and reliability when fuel-cut is effected.

Figure 11:
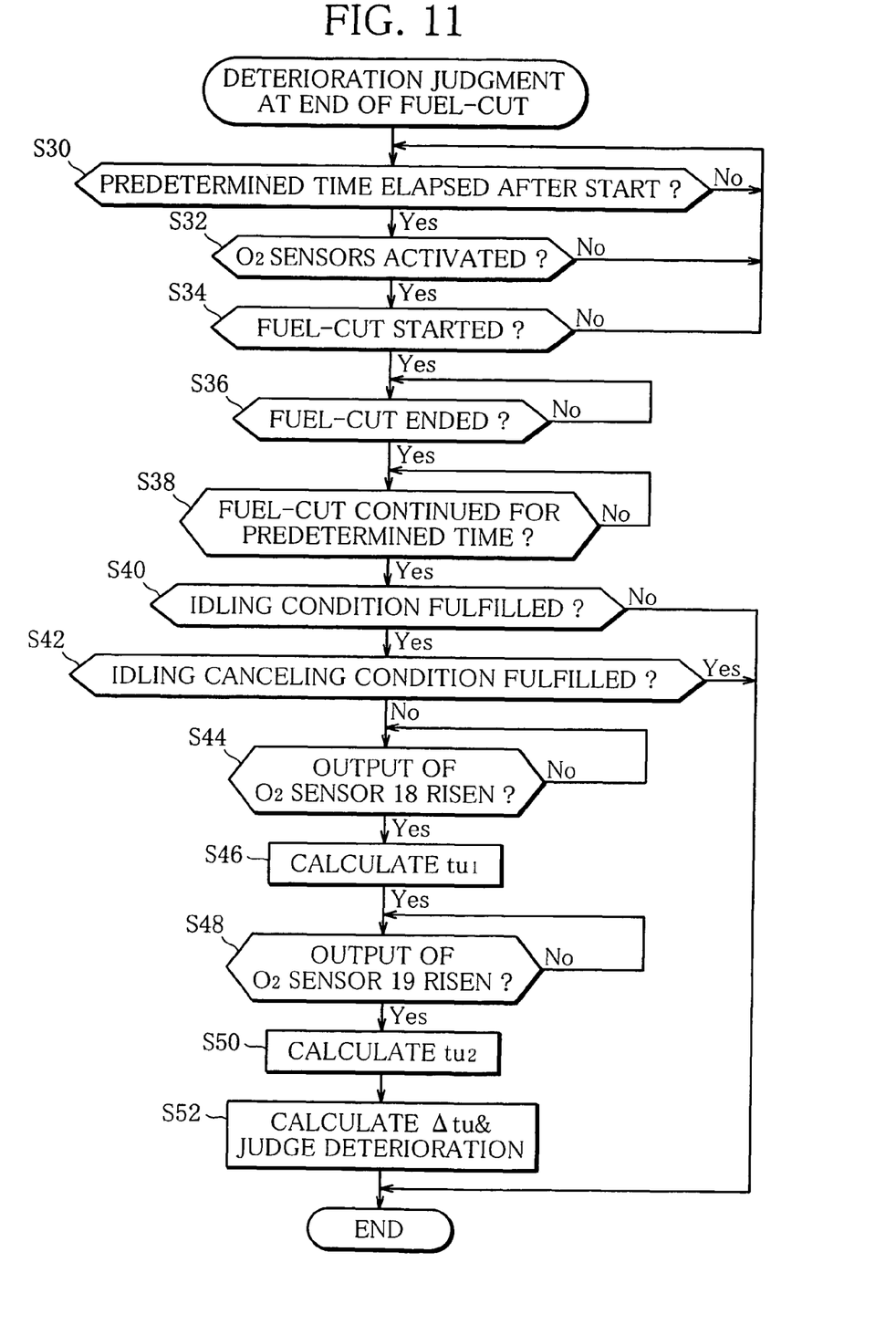
FIG. 11 is a flowchart showing the procedure for judging deterioration at the end of fuel-cut operation, which is executed in conjunction with the third embodiment.

FIG. 11 is a flowchart showing the procedure for judging deterioration at the end of fuel-cut operation, which is executed in conjunction with the third embodiment. Referring also to FIG. 10, the flowchart of FIG. 11 will be explained below.

Steps S30, S32 and S34 are respectively identical with Steps S10, S12 and S14 explained above, and therefore, description thereof is omitted.

In Step S36, it is determined whether or not the fuel-cut has terminated. Fuel-cut is terminated, for example, when the accelerator is operated again or when the engine speed Ne has dropped to the predetermined lower-limit speed, in which case fuel supply is restarted. In this step, therefore, it is determined whether either of these conditions for terminating fuel-cut is fulfilled or not. If No in Step S36, the routine waits until the fuel-cut is terminated; if Yes in Step S36, the routine proceeds to Step S38.

In Step S38, it is determined whether or not the fuel-cut has been continued for a predetermined time. Namely, it is determined whether or not the fuel-cut has been effected so long and stably that falls of the detection outputs of the upstream and downstream $O_2$ sensors 18 and 19 can be detected. If No in Step S38, the routine waits until the fuel-cut is continued for the predetermined time; if Yes in Step S38, the routine proceeds to Step S40.

In Step S40, it is determined whether or not an idling condition of the engine 1 is fulfilled. If No in Step S40, the routine is ended; if Yes in Step S40, that is, if the idling condition is fulfilled, the routine proceeds to Step S42.

In this routine, deterioration of the HC adsorbing material is judged by detecting a time tu1, which is a time period elapsed before the detection of a rise of the output of the upstream $O_2$ sensor 18 at the termination of fuel-cut, and a time tu2, which is a time period elapsed before the detection of a rise of the output of the downstream $O_2$ sensor 19 at the termination of fuel-cut, as described later. Where the fuel-cut is terminated because the accelerator is operated again, for example, the quantity of air and thus the exhaust gas flow rate increase, so that the times tu1 and tu2 significantly vary, making it difficult to accurately judge deterioration of the HC adsorbing material, but if the engine is idling when the fuel supply is restarted following the termination of the fuel-cut, the air quantity is constant and thus the times tu1 and tu2 can be regarded as stable, making it possible to accurately judge deterioration of the HC adsorbing material.

In Step S42, it is determined whether or not an idling canceling condition of the engine 1 is fulfilled. If Yes in Step S42, the routine is ended; if No in Step S42, that is, if the idling canceling condition is not fulfilled and thus the engine is idling, the routine proceeds to Step S44.

In Step S44, it is determined based on the detection output of the upstream $O_2$ sensor 18 whether or not the exhaust A/F on the upstream side of the HC trap 20 has greatly changed toward stoichiometric A/F side, that is, whether or not the detection output of the upstream $O_2$ sensor 18 has risen because of the resumption of the catalytic capacity of the three-way catalytic converter 16. If No in Step S44, the routine waits until a rise of the output of the upstream $O_2$ sensor 18 is detected; if Yes in Step S44, the routine proceeds to Step S46.

In Step S46, the time period tu1 from the time the idling is started to the time the rise of the detection output of the upstream $O_2$ sensor 18 is detected is calculated.

In Step S48 executed after the detection of the rise of the detection output of the upstream $O_2$ sensor 18, it is determined based on the detection output of the downstream $O_2$ sensor 19 whether or not the exhaust A/F on the downstream side of the HC trap 20 has greatly changed toward stoichiometric A/F side, that is, whether or not the detection output of the downstream $O_2$ sensor 19 has risen as a result of the termination of the outflow of oxygen from the HC trap 20. If No in Step S48, the routine waits until a rise of the detection output of the downstream $O_2$ sensor 19 is detected; if Yes in Step S48, the routine proceeds to Step S50.

In Step S50, the time period tu2 from the time the idling is started to the time the rise of the detection output of the downstream $O_2$ sensor 19 is detected is calculated.

Then, in Step S52, a rise delay time Δtu (follow-up delay) of the downstream $O_2$ sensor 19 is calculated (Δtu=tu2−tu1) from the time tu1, which is the time period from the start of the idling to the detection of the rise of the output of the upstream $O_2$ sensor 18, and the time tu2, which is the time period from the start of the idling to the detection of the rise of the output of the downstream $O_2$ sensor 19, and deterioration of the HC adsorbing material 22 is judged based on the calculated delay time Δtu.

Specifically, if the HC adsorbing material 22 is not deteriorated, the Ce contained therein does not exhibit its oxygen storage capacity, and therefore, the rise delay time Δtu should be equal to the transport lag of the exhaust gas. Thus, if the delay time Δtu is longer than the transport lag, it can be judged that the Ce is releasing oxygen adsorbed by its oxygen storage capacity and thus that the HC adsorbing material 22 is deteriorated.

In this manner, also when fuel-cut is terminated, manifestation of the oxygen storage capacity of Ce contained in the HC adsorbing material can be easily detected on the basis of the delay time Δtu, as in the case of the start of fuel-cut. Accordingly, even in the case where the three-way catalytic converter 16 is used as the front-end catalytic converter, deterioration of the HC adsorbing material 22 can be judged with high accuracy and reliability when fuel-cut is terminated.

While the HC adsorbing material and the deterioration judging devices according to the preferred embodiments of the present invention have been described, the present invention is not limited to the above embodiments alone.

For example, in the foregoing, the HC adsorbing material is prepared by allowing cerium (Ce) ions to bond to the zeolite. The element used for such ion bond is not limited to Ce and any other elements (e.g., Pr) that exhibit oxygen storage capacity in a nonionic state may be used.

Further, in the above embodiments, the upstream and downstream $O_2$ sensors 18 and 19 are used, but these sensors may be replaced by air/fuel ratio sensors (LAFS etc.) capable of detecting the concentration of oxygen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for judging deterioration of a HC adsorbing material arranged in an exhaust passage of an internal combustion engine, wherein the HC adsorbing material comprises a zeolite having cation adsorption sites to which are bonded ions of an element that exhibits oxygen storage capacity in a nonionic state, and the device comprises:

downstream oxygen concentration detecting means arranged downstream of the HC adsorbing material with respect to a flow of exhaust gas, for detecting concentration of oxygen in the exhaust gas;

deterioration judging means for detecting manifestation of the oxygen storage capacity of the element, based on a detection output of the downstream oxygen concentration detecting means, to judge deterioration of the HC adsorbing material; and upstream oxygen concentration detecting means arranged upstream of the HC adsorbing material with respect to the exhaust gas flow, for detecting concentration of oxygen in the exhaust gas, and wherein the deterioration judging means judges deterioration of the HC adsorbing material, based on detection outputs of the upstream and downstream oxygen concentration detecting means, wherein the deterioration judging means judges deterioration of the HC adsorbing material, based on the outputs of the upstream and downstream oxygen concentration detecting means detected when a fuel-cut operation of the internal combustion engine is started.

2. A device for judging deterioration of a HC adsorbing material arranged in an exhaust passage of an internal combustion engine, wherein the HC adsorbing material comprises a zeolite having cation adsorption sites to which are bonded ions of an element that exhibits oxygen storage capacity in a nonionic state, and the device comprises:

downstream oxygen concentration detecting means arranged downstream of the HC adsorbing material with respect to a flow of exhaust gas, for detecting concentration of oxygen in the exhaust gas;

deterioration judging means for detecting manifestation of the oxygen storage capacity of the element, based on a detection output of the downstream oxygen concentration detecting means, to judge deterioration of the HC adsorbing material; and upstream oxygen concentration detecting means arranged upstream of the HC adsorbing material with respect to the exhaust gas flow, for detecting concentration of oxygen in the exhaust gas, and wherein the deterioration judging means judges deterioration of the HC adsorbing material, based on detection outputs of the upstream and downstream oxygen concentration detecting means, wherein the deterioration judging means judges deterioration of the HC adsorbing material, based on the outputs of the upstream and downstream oxygen concentration detecting means detected when a fuel-cut operation of the internal combustion engine is terminated.

3. A device for judging deterioration of a HC adsorbing material arranged in an exhaust passage of an internal combustion engine, wherein the HC adsorbing material comprises a zeolite having cation adsorption sites to which are bonded ions of an element that exhibits oxygen storage capacity in a nonionic state, and the device comprises:

downstream oxygen concentration detecting means arranged downstream of the HC adsorbing material with respect to a flow of exhaust gas, for detecting concentration of oxygen in the exhaust gas;

deterioration judging means for detecting manifestation of the oxygen storage capacity of the element, based on a detection output of the downstream oxygen concentration detecting means, to judge deterioration of the HC adsorbing material; and an exhaust gas-purifying catalyst located in or on the HC adsorbing material and having oxygen storage capacity, and wherein the deterioration judging means judges deterioration of the HC adsorbing material when temperature of the exhaust gas-purifying catalyst and temperature of the HC adsorbing material are both higher than a first temperature range in which the exhaust gas-purifying catalyst exhibits the oxygen storage capacity, and fall within a second temperature range in which the HC adsorbing material exhibits the oxygen storage capacity while the exhaust gas-purifying catalyst does not exhibit the oxygen storage capacity.

* * * * *